No. 814,983. PATENTED MAR. 13, 1906.
R. A. NORLING.
PNEUMATIC HAMMER.
APPLICATION FILED MAY 31, 1905.
6 SHEETS—SHEET 1.
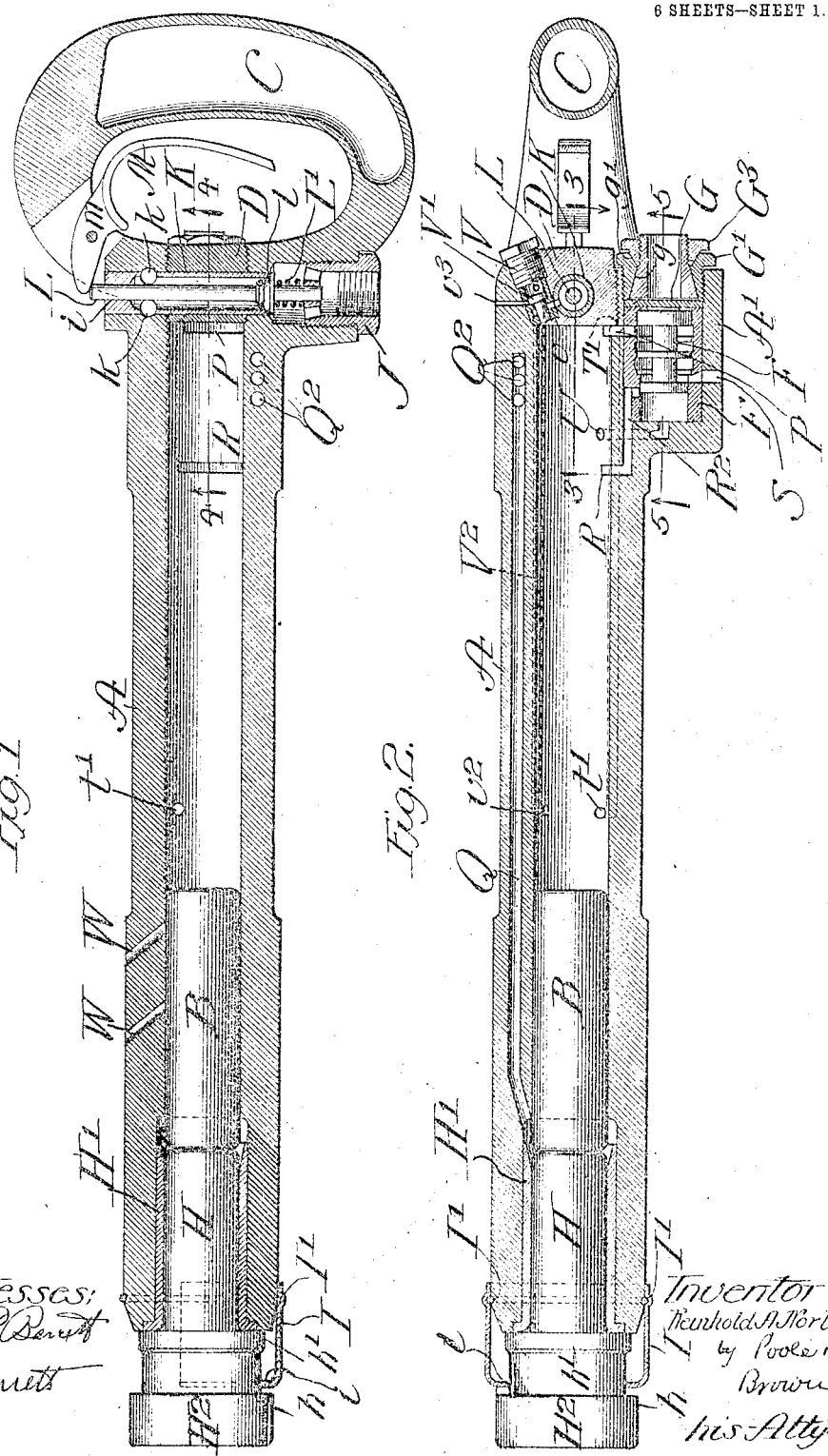

No. 814,983. PATENTED MAR. 13, 1906.
R. A. NORLING.
PNEUMATIC HAMMER.
APPLICATION FILED MAY 31, 1905.

6 SHEETS—SHEET 2.

Witnesses:
Edw. P. Barrett
N. G. Barrett

Inventor
Reinhold A. Norling
by Poole & Brown
His Atty's

No. 814,983.
PATENTED MAR. 13, 1906.
R. A. NORLING.
PNEUMATIC HAMMER.
APPLICATION FILED MAY 31, 1905.
6 SHEETS—SHEET 3.
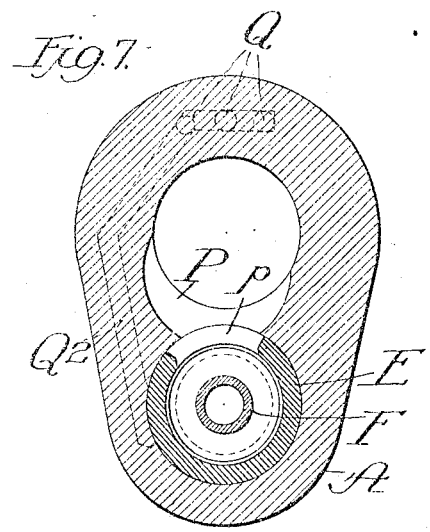
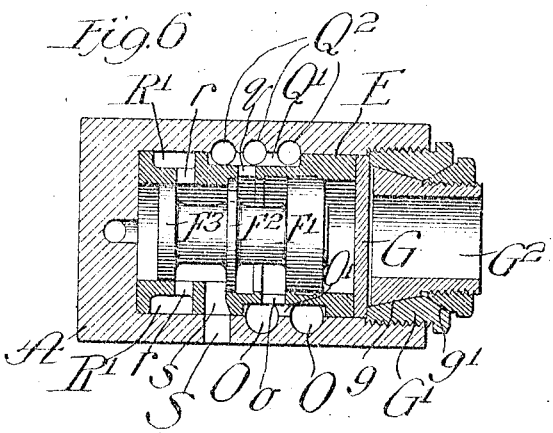
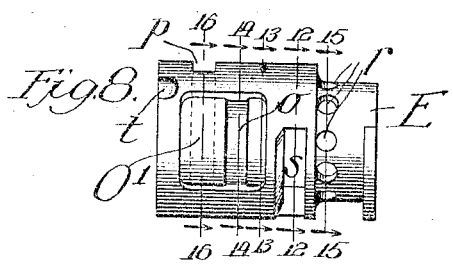
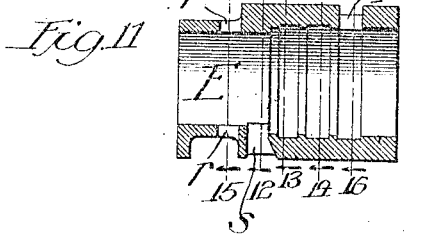
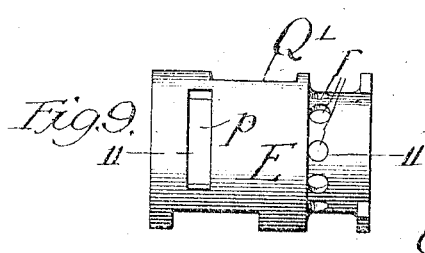
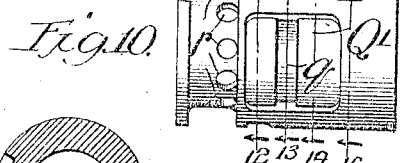
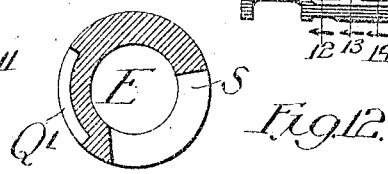
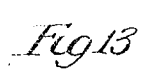
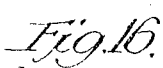
Witnesses
Edw. P. Barrett
H. G. Barrett
Inventor
Reinhold A. Norling
by Poole & Brown
his Atty's No. 814,983. PATENTED MAR. 13, 1906.
R. A. NORLING.
PNEUMATIC HAMMER.
APPLICATION FILED MAY 31, 1905.

6 SHEETS—SHEET 4.

Witnesses:

Inventor
Reinhold A. Norling
by Poole & Brown
his Attys

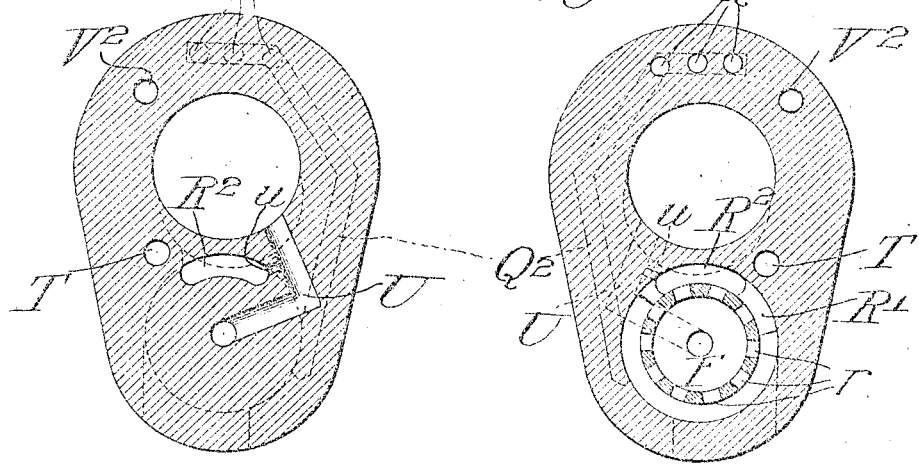

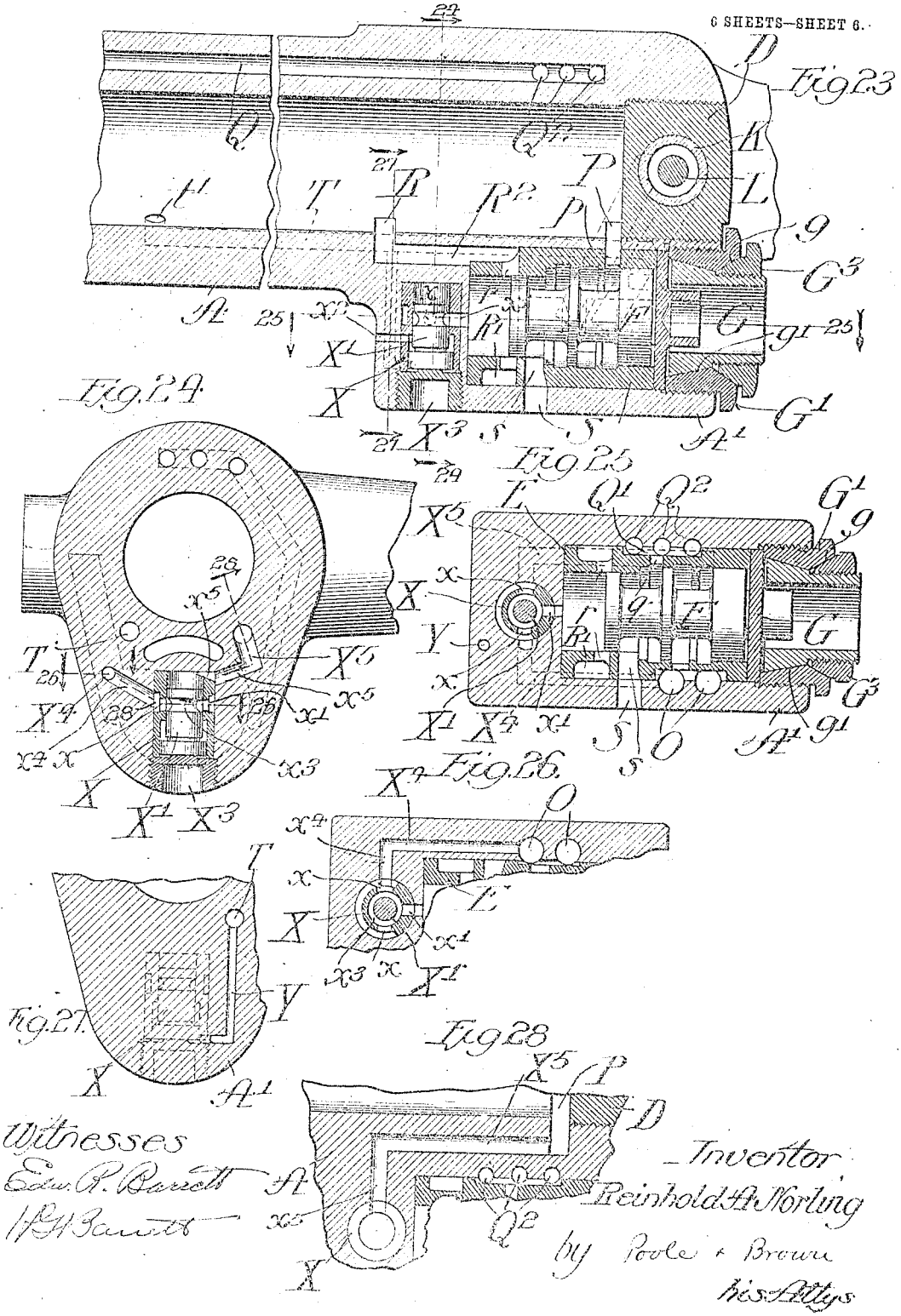

UNITED STATES PATENT OFFICE.

REINHOLD A. NORLING, OF AURORA, ILLINOIS, ASSIGNOR TO AURORA AUTOMATIC MACHINERY COMPANY, OF AURORA, ILLINOIS, A CORPORATION OF ILLINOIS.

PNEUMATIC HAMMER.

No. 814,983.  Specification of Letters Patent.  Patented March 13, 1906.

Application filed May 31, 1905. Serial No. 263,077.

*To all whom it may concern:*

Be it known that I, REINHOLD A. NORLING, a citizen of the United States, residing at Aurora, in the county of Kane and State of Illinois, have invented certain new and useful Improvements in Pneumatic Hammers; and I do hereby declare that the following is a full, clear, and exact description thereof, reference being had to the accompanying drawings, and to the letters of reference marked thereon, which form a part of this specification.

This invention relates to a pneumatic tool in the nature of a portable pneumatic hammer or device of that class embracing a barrel or cylinder, a piston or plunger adapted to slide therein, and a controlling-valve through which the air or other fluid under pressure is admitted to and permitted to escape from the opposite ends of the cylinder or barrel to give reciprocatory movement to the plunger therein.

The tool illustrated in the accompanying drawings is designed for use as a riveting-hammer; but the same features of construction illustrated in said drawings and herein claimed may be employed in a tool used for chipping or other purposes.

The invention consists in the matters hereinafter described and more particularly pointed out in the appended claims.

Figure 3:
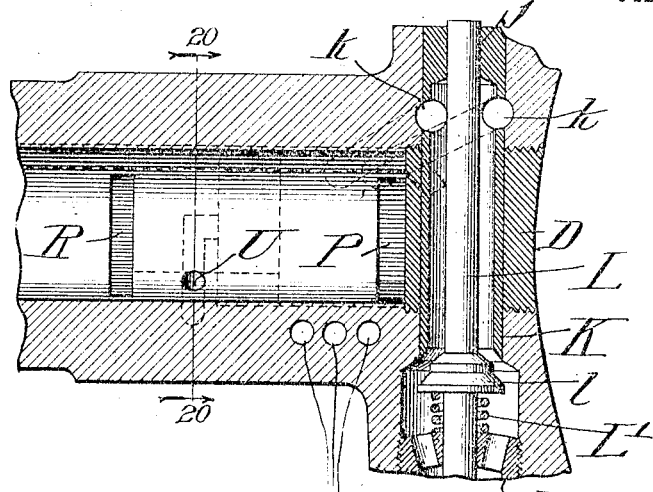
Figure 4:
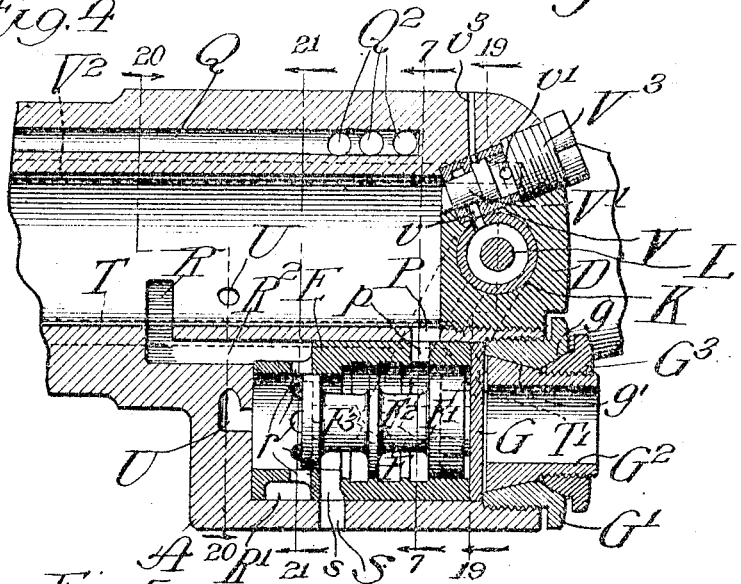
Figure 5:
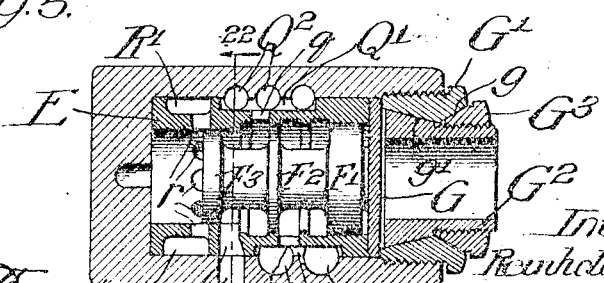
Figure 17:
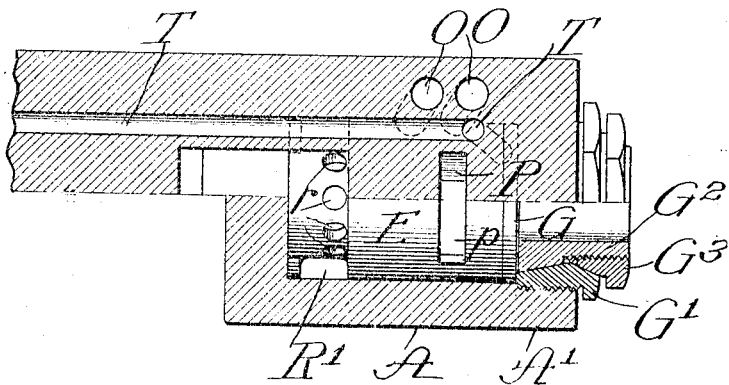
Figure 18:
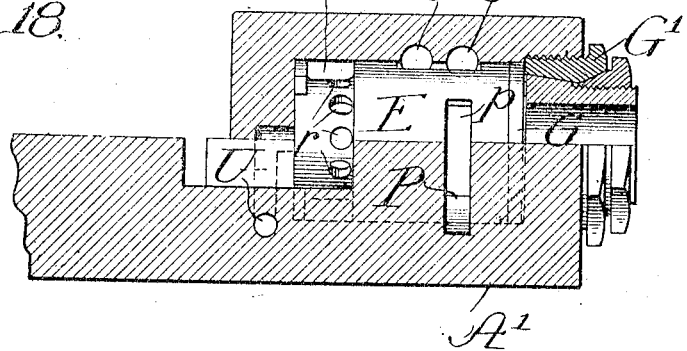
Figure 19:
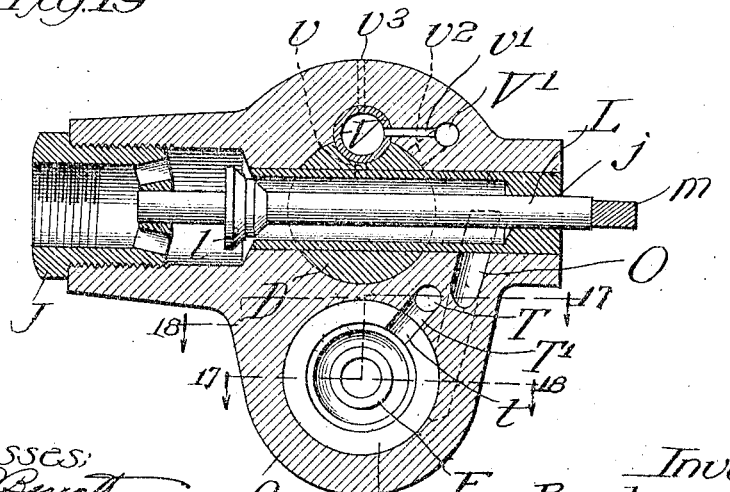

As shown in the accompanying drawings, Figure 1 is a view in central longitudinal section of a tool embodying my invention, taken through the central axis of the throttle-valve. Fig. 2 is a central longitudinal section of the same, taken transversely through the throttle-valve and through the central axis of the controlling-valve. Fig. 3 is an enlarged detail section taken upon line 3 3 of Fig. 2 and showing the throttle-valve and adjacent parts. Fig. 4 is a like enlarged detail section taken on line 4 4 of Fig. 1. Fig. 5 is an enlarged detail longitudinal section through the controlling-valve, taken on line 5 5 of Fig. 2. Fig. 6 is a section like Fig. 5, showing the valve-piston in a changed position. Fig. 7 is a detail cross-section taken through the controlling-valve and barrel upon line 7 7 of Fig. 4. Figs. 8, 9, and 10 are views in side elevation of the controlling-valve bushing. Fig. 11 is a longitudinal section of said bushing, taken on line 11 11 of Fig. 9. Figs. 12, 13, 14, 15, and 16 are sectional views of said controlling-valve bushing, taken upon lines 12 12, 13 13, 14 14, 15 15, and 16 16 of Figs. 8, 10, and 11. Fig. 17 is a detail longitudinal section taken upon the indirect line 17 17 of Fig. 19. Fig. 18 is a like detail section taken upon the indirect line 18 18 of Fig. 19. Fig. 19 is a detail cross-section taken on line 19 19 of Fig. 4. Fig. 20 is a detail cross-section taken upon the line 20 20 of Fig. 4. Fig. 21 is a detail cross-section taken upon line 21 21 of Fig. 4. Fig. 22 is a detail cross-section taken upon line 22 22 of Fig. 5. Fig. 23 is a view in central longitudinal section of the inner end of the cylinder, taken through the central axis of the controlling-valve and the auxiliary valve, illustrating a construction in which the air-supply for operating the controlling-valve is carried directly thereto from the throttle-valve without passing through the cylinder. Fig. 24 is a cross-section taken upon line 24 24 of Fig. 23. Fig. 25 is a section taken longitudinally through the controlling-valve and transversely through the auxiliary valve on line 25 25 of Fig. 23. Fig. 26 is a detail section taken upon line 26 26 of Fig. 24. Fig. 27 is a detail section taken upon the indirect line 27 27 of Fig. 24. Fig. 28 is a detail section taken upon the indirect line 28 28 of Fig. 24.

As shown in said drawings, A indicates the working cylinder or barrel of the tool, B the sliding plunger therein, and C a handle which is made integral with the inner end of the cylinder A. The said cylinder A is originally provided with a bore extending through the same from end to end, and said bore is closed at the inner end of the cylinder by means of a screw-plug D. In the inner end of the barrel adjacent to the handle and arranged generally parallel therewith is a transversely-arranged throttle-valve which passes through the plug D and the parts of the barrel adjacent thereto. On one side of the cylinder at its inner end is located an extension or projection forming a valve-casing A' of a controlling-valve. Said controlling-valve embraces a valve-bushing E and a valve piston F. Said bushing and piston are cylindric and arranged with their central axes parallel with the central axis of the cylinder or barrel.

The controlling-valve chamber is formed by the bore of the bushing E and is closed at its outer end by the integral inner end wall of the casing A' and at its inner end or that adjacent to the handle by means of a circular plate or diaphragm G, which is clamped or held in contact with the adjacent end of the bushing E by means of an exteriorly-screw-threaded expansible split thimble G'. For expanding the split thimble the latter is provided with oppositely-inclined interior conical surfaces $g\ g'$, and a tube $G^2$ is located in the thimble, said tube having at its inner end an exterior conical surface adapted to fit the interior conical surface $g'$ of the thimble G' and on its outer end a nut $G^3$, having at its inner end a conical exterior surface adapted to fit the conical surface $g$ of the said thimble.

H is a tool-carrying spindle which is mounted in the outer end of the barrel and against the inner end of which the plunger B is adapted to act. Said tool-spindle H has a limited sliding movement in a bushing H', secured in the outer end of the barrel. The spindle is shown as provided at its outer end with a riveting-head $H^2$, which in the instance illustrated constitutes the tool referred to. For limiting the endwise movement of the spindle H in the barrel the latter is shown as having attached to it a stop-plate I of segmental form provided with a flange $i$, that projects into a space or groove formed between two shoulders $h\ h'$ on the head $H^2$. The segmental stop-plate I is shown as secured to the end of the barrel by means of an annular groove $a$ in the barrel, which is engaged by a ring I', to which the stop-plate I is rigidly secured.

The throttle-valve illustrated in the drawings is located in a transverse bore or passage which opens at its ends through the outer surfaces of the opposite side walls of the cylinder. In one end of the bore or passage is inserted a screw-threaded sleeve or nipple J, adapted for the attachment thereto of the pipe or hose through which air is supplied to the tool. Within said bore or passage is located a tubular valve-bushing K, in which is arranged longitudinally a valve-stem L, provided with a valve-disk $l$, adapted to bear against a valve-seat formed on the inner end of the bushing K. The opposite end of said valve-stem extends through a guide-aperture formed in the outer end of the valve-bushing. The outer end of said valve-stem is adapted for contact with an arm $m$ on an actuating lever or trigger M, pivotally mounted on the handle, and its inner end passes through a guide-ring $j$ on the thimble J. Between said ring $j$ and the valve-disk $l$ is located a coiled actuating-spring L', by which the valve-disk is held normally against its seat. The bushing L is provided between its ends with outlet-ports $k\ k$, which communicate with oblique passages O O, leading to the controlling-valve chamber. The valve-disk $l$ when in contact with its seat shuts off communication between the air-supply passage and the interior of the valve-bushing. The valve may be opened by endwise pressure of the trigger-arm $m$ against the said valve-spindle L operating against the tension of the spring L' and the air-pressure acting on the valve-disk.

Now referring to the details of construction illustrated in the controlling-valve, the means for actuating the same, and the ports or passages connecting said valve with the interior of the cylinder, these parts are made as follows: First, referring to the construction of the valve-bushing E, said bushing is interiorly cylindric and of smaller interior diameter at its outer end or that remote from the plate G than at its inner end or that nearest the handle. The valve-piston F is provided with annular enlargements or flanges $F'\ F^2$ of equal diameter, separated by grooves or recesses and adapted to fit and slide within the larger cylindric part of the valve-bushing. At its outer end the said valve-piston is provided with a cylindric part $F^3$ of less diameter than the main part of the piston and which slides within the smaller portion of the valve-bushing. In the said valve-bushing is formed a port $o$, which communicates with a recess O', Figs. 5 and 6, formed in the outer surface of the valve-bushing, as clearly seen in Figs. 6, 8, and 14. Said recess O' is in communication with the two supply-passages O O, which extend from the ports $k\ k$ of the throttle-valve bushing K obliquely through the wall of the cylinder to the said recess. The port $o$ constitutes an inlet-port through which air is supplied to the interior of the valve-bushing. The said port $o$ is so arranged that when the valve-piston is at either limit of its movement it will be between the enlargements $F'\ F^2$ of said piston, which are at such distance apart that the piston may move its full stroke without the said port $o$ being covered by either of said flanges. Said valve-bushing is also provided with a supply-port $p$, Figs. 4, 9, and 11, communicating with a cylinder admission-passage P, which opens into the inner end of the cylinder. Said port $p$ is arranged to come opposite the annular groove between the flanges $F'\ F^2$ when the piston is at the inward limit of its movement, but to be covered by the enlargement F' when the piston is at the outward limit of its movement, as seen in Figs. 4 and 6. Said enlargements F' and $F^2$, with the ports $o$ and $p$, Fig. 7, serve to control the supply of air to the inner end of the cylinder. When the piston is at the inward limit of its movement, the port $o$ is connected with the port $p$ by the groove between the enlarged parts F' and $F^2$, thereby admitting the pressure fluid to the inner end of the cylinder for forcing the plunger therein outward. The said bushing E is also provided with a port $q$, Figs. 5 and 6, constituting an admission and exhaust port for the outer end of the cylinder. Said port $q$ communicates with a recess $Q'$, formed in the outer surface of the bushing, as seen in Figs. 5, 6, 10, 13, and 22. The said recess $Q'$ is in communication with transverse passages $Q^2 Q^2 Q^2$, which, as shown in Figs. 4 and 22, communicate with longitudinal passages $Q Q Q$, which extend through the wall of the cylinder and, as seen in Fig. 2, communicate with the interior of the same at its outer end. The port $q$, recess $Q'$, passages $Q^2$, and passages $Q$, Figs. 2 and 5, afford communication between the controlling-valve chamber and the outer end of the cylinder, by means of which the pressure fluid is admitted to the said outer end of the cylinder for the purpose of driving the piston or plunger inwardly, and the exhaust passes from the outer end of the cylinder to the controlling-valve. The ports $o$ and $q$ are both adapted to coact with the enlargement $F^2$ of the valve-piston, the arrangement thereof being such that the enlargement $F^2$ passes over the port $q$ in the movement of the valve-piston, so that when the piston is at the outward limit of its movement, as seen in Fig. 6, the ports $o$ and $q$ are connected by the groove between the enlargements $F'$ and $F^2$, and when the piston is at the inward limit of its movement, as seen in Figs. 4 and 5, communication between said ports $o$ and $q$ is cut off by the flange $F^2$. When the valve-piston is at the outward limit of its movement, pressure fluid passes from the supply-passages O O, through the ports $o$, the port $q$, passages $Q^2$, and the passages $Q$ to the outer end of the cylinder. The bushing E is also provided with a plurality of ports $r r r$, Figs. 4, 5, 6, 8, 9, 10, 11, 15, and 21, communicating with an annular groove or recess $R'$, which surrounds the smaller end of the valve-chamber and which communicates by a longitudinal passage $R^2$ with the exhaust-port R for the inner end of the cylinder, said port being located at some distance from the admission-port. The ports $r r r$ are so located that the flange $F^3$ of the valve-piston passes over the same in the movement of said piston and will be nearly covered by said flange $F^3$ of the valve-piston when the latter is at the inward limit of its movement, as seen in Figs. 4 and 5, but will communicate with the groove $f''$ between the enlargements $F^2$ and $F^3$ when the piston is at the outward limit of its movement, as seen in Fig. 6. Said valve-bushing E is provided with a main exhaust-port $s$, arranged between the ports $q$ and $r$ and communicating with an exhaust-opening S in the valve-casing. When the valve-piston is at the inward limit of its movement, as seen in Figs. 4 and 5, the port $q$ will be in communication with the exhaust-port $s$, Fig. 5, so that the exhaust from the outer end of the cylinder will pass through the groove between the flanges $F^2$ and $F^3$ to said main exhaust-port $s$. When the valve-piston is shifted to the outward limit of its movement, or to the position seen in Fig. 6, the ports $r r r$ will be brought into communication with the exhaust-port $s$ by the groove between the enlargements $F^2$ and $F^3$, Fig. 6, and the exhaust from the inner end of the cylinder will pass from the cylinder-exhaust port R through the exhaust-ports $r r r$ to the main exhaust-port $s$.

From the above it will be understood that when the valve-piston F is at the outward limit of its movement pressure fluid will be admitted by the supply-passages O O to the passages Q Q, leading to the outer end of the cylinder, and when said valve-bushing is at the inward limit of its movement the exhaust from the inner end of the cylinder will pass from the exhaust-port R to the exhaust-port S and that the pressure fluid is admitted to the inner end of the cylinder when the valve-piston is at the inward limit of its movement by the connection of the passages O O with the supply-port P through the port $o$ and port $p$, and communication is at the same time established between the passages Q Q, leading to the outer end of the cylinder and the main exhaust-port S, through the port $q$, as hereinbefore set forth.

Now referring to means shown for shifting or giving endwise movement to the valve-piston, this is accomplished generally by air-pressure from the supply-pipe acting on the larger part $F'$ of the valve-piston to move the same outwardly and by pressure on the smaller part $F^3$ of said piston of air admitted to the inner end of the cylinder from the supply-pipe through the action of an auxiliary valve and by which the valve-piston is thrown inwardly, said auxiliary valve being operated by the pressure of air which is compressed in the inner end of the cylinder in the back stroke of the plunger. For giving outward movement to the valve-piston a longitudinal passage T, Fig. 17, is formed in the wall of the cylinder and communicates at the inner end thereof by an oblique passage $T'$ with the space between the inner enlargement $F'$ of the valve-piston and the plate G, which forms the end wall of the valve-chamber. Said passage $T'$ communicates with the interior of the bushing E by means of a small oblique passage $t$, formed in the end portion of the bushing, as clearly seen in Figs. 8 and 19. At its outer end the passage T communicates with the interior of the cylinder by a port $t'$, located at such distance from the outer end of the cylinder that it will be uncovered by the plunger B when the latter is near the outward limit of its movement, as seen in Figs. 1 and 2. U, Fig. 20, is a transverse passage which at one end communicates with the interior of the cylinder and at its opposite end is connected with the smaller end of the valve-chamber or the space between the part $F^3$ of the valve-piston and the adjacent or outer end of said valve-chamber. The passage U communicates by a small passage $u$ with the exhaust-passage $R^2$.

The auxiliary valve consists of a cylindric valve-bushing V, Figs. 2, 4, and 18, inserted in the inner end of the cylinder, closed at its outer end by a plug $V^3$ and opening at its inner end into the cylinder. In said valve-casing is an endwise-sliding valve-plug V', having at its outer end an enlarged part or head, which fits and slides in the correspondingly-enlarged outer part of the valve-bushing V. A passage $v$ leads from the smaller inner part of the valve-bushing to the interior of the bushing K of the throttle-valve. A second passage $v'$ leads from the outer or larger end of the bushing V to a longitudinal passage $V^2$, which opens into the cylinder through a port $v^2$, located at such distance from the outer end of the cylinder that it will be uncovered by the plunger when the latter approaches the outer limit of its movement, as seen in Fig. 2. A third passage $v^3$ leads from the bushing V at a point adjacent to the shoulder between the larger and smaller parts of the bushing V outwardly through the wall of the cylinder to the outer air. The smaller inner end of the valve-plug V' is exposed to the pressure of air in the inner end of the cylinder, while the larger outer end of said plug is subject to live-air pressure from the interior of the cylinder entering the passage $V^2$ when the plunger reaches the outer limit of its stroke. The inner or smaller end of the plug V' acts with the part of the bushing which surrounds it to form a valve for controlling the passage of air through the passage $v$ from the air-supply pipe to the inner end of the cylinder, the said plug closing the passage when at the inner limit of its movement. When the plug V' is at the outward limit of its movement, air is free to pass from the supply-pipe through the passage $v$ to the inner end of the cylinder. The passage $v^3$ serves merely as a leakage-port to permit escape of air from the interior of the cylinder on its larger outer end.

As soon as the port $t'$ is uncovered by the plunger B in its outward movement pressure fluid from the interior of the cylinder will pass through the passage T and acting on the inner larger end of the piston will force the same outwardly, it being understood that the smaller outer end of the valve-piston will be subject to the same pressure, but by reason of said smaller area of the outer end of the valve-piston pressure on the larger end thereof will overcome such pressure on the smaller end. It follows that as the plunger approaches the outer limit of its movement the valve-piston will be shifted to bring the same into position for the admission of the pressure fluid to the outer end of the cylinder and effect the opening of the exhaust-port R, so as to permit the escape of the exhaust from the inner end of the cylinder in the return stroke of the plunger. As said plunger approaches the inward limit of its stroke it will cover or close the exhaust-port R and also the passage U and will thereafter act to compress the air confined within the inner end of the cylinder, which at this time will have no outlet through the controlling-valve, because the port $o$ will at this time be closed by the valve-piston. The air confined within the cylinder will act on the smaller inner end of the plug V' of the auxiliary valve and force the same outwardly.

The passage U being connected with the exhaust-port R by the small passage $u$, no air will be forced through the said passage U into the controlling-valve chamber after the plunger in its inward movement passes said exhaust-port, for the reason that until the passage U is covered by the plunger air is free to pass from the interior of the cylinder through the said passage U, the passage $u$, and the exhaust-passage $R^2$ to the outer air. The plunger is started in its outward or return movement by the action of the air compressed within the inner end of the cylinder, and as soon as the passage U is uncovered by the plunger in such outward movement thereof air under pressure from the supply-pipe, admitted to the inner end of the cylinder through the passage $v$ of the auxiliary valve, passes from said inner end of the cylinder through the passage U to the outer or smaller end of the controlling-valve chamber and acting on the smaller end of the valve-piston F forces the latter inwardly, bringing it into position for admission of air to the inner end of the cylinder through the inlet-port P and for the exhaust of air from the outer end of the cylinder through the passages Q, $Q^2$, and Q', the port $q$, and the main exhaust-port S. Some of the air entering the passage U will escape through the small passage $u$ to the main exhaust-port; but the quantity which will thus escape will be so small as to be of no consequence so far as the operation of the air-pressure to move the controlling-valve piston is concerned.

The air which is between the inner larger end of the piston and the plate G at this time is allowed to escape through the passage T and port $t'$ to the interior of the cylinder at the outer end thereof, which may be provided with the usual auxiliary exhaust-ports W W and wherein the pressure will be less than that at the inner end of the cylinder. The auxiliary-valve plug V' will remain in position for admission of air through said auxiliary valve to the cylinder until the plunger approaches the outer limit of its stroke and uncovers the port $v^2$, when air from the inner end of the cylinder will pass through the passage $V^2$ and the passage $v'$ and acting on the larger end of the said plug $V'$ will force the latter inwardly and close the passage $v$.

The operation of the valve described is as follows: When the valve-piston F is at the rearward or inward limit of its stroke, it is in position for admission of the pressure fluid to the inner end of the cylinder and the exhaust of the air from the outer end thereof. At this time air from the throttle-valve enters the valve-chamber through the port $o$ and passes through the grooves $f$ to the port $p$ and is thus delivered to the inner end of the cylinder through the admission-port P. At this time the exhaust from the outer end of the cylinder passes through the passages $Q$ and $Q^2$ and the port $q$ to the interior space of the valve-chamber, and thence to the exhaust-port $s$. When the plunger in its outward movement passes and uncovers the cylinder-port $t'$, air under pressure from the interior of the cylinder passes through the passage T and acting on the larger inner end of the valve-piston forces the same outward against the like pressure on the smaller outer end of the valve-piston. The auxiliary valve is at this time open and when the plunger passes and opens the port $v^2$ air enters the passage $V^2$ and closes said auxiliary valve by shifting to its inward position the plug $V'$. When the valve-piston is shifted to its outward position, its parts will be in condition for the admission of air to the outer end of the cylinder and the exit of the exhaust from the inner end thereof. At this time air from the supply-passages O O enters the valve-chamber through the port $o$ and passes through the groove $f$ of the valve-piston and out through the port $q$ to the passages $Q^2$ and Q, by which it is conducted to the outer end of the cylinder. At this time exhaust from the inner end of the cylinder passes out through the exhaust-port R, passage $R^2$, and the port $r$ to the exhaust-port $s$. As soon as the plunger in its inward movement passes the exhaust-port R and passage U air within the inner end of the cylinder is confined, because the port $o$ is then closed by the enlargement $F'$ of the valve-piston, and the imprisoned air is compressed and shifts outwardly the valve-plug $V'$ of the auxiliary valve. Air is thus admitted from the supply-pipe to the inner end of the cylinder, and as soon as the plunger passes the passage U in its outward movement the live air from the supply pipe passes from the cylinder through the passage U and entering the outer end of the controlling-valve chamber acts upon the smaller outer end of the piston therein to throw the same inwardly, the passage T at this time being in communication with the outer air through the auxiliary exhaust-ports W W.

In Figs. 23 to 28 I have shown a modified construction of the parts which embraces an auxiliary valve operating generally in the same manner as hereinbefore described, but in which the air-supply to the outer or smaller end of the controlling-valve piston is carried from the throttle-valve through passages in the walls of the cylinder to the smaller end of the controlling-valve bushing instead of being delivered to and passing through the inner end of the cylinder itself, as in the construction hereinbefore described. The cylinder and the controlling-valve are in this instance constructed in the same manner as hereinbefore described and are correspondingly lettered in the drawings. In this instance the auxiliary valve is located in the inner end of the lateral projection $A'$ of the cylinder, which is provided to contain the controlling-valve, and the said auxiliary valve consists of a cylindric valve-bushing X inserted in a cylindric bore formed in the said lateral extension at right angles to the bore of the controlling-valve, the bushing being closed at its outer end and held in place by a screw-plug $X^3$. In the valve-bushing is an endwise-sliding valve-plug $X'$, having at its outer end an enlarged part or head $X^2$, which fits and slides in a correspondingly enlarged part of the valve-bushing X. The smaller part of the valve-bushing is provided with two lateral ports $x\ x$, communicating with a passage extending partially around the outside of the bushing, which passage is connected by a transverse passage $x^4$ with a longitudinal passage $X^4$, that extends to and communicates with one of the passages O, leading from the throttle-valve to the controlling-valve. Said valve-bushing is also provided with a second port $x'$, arranged in circumferential alinement with the ports $x\ x$ and leading into the smaller end of the valve-chamber of the controlling-valve, Figs. 23 and 25. A third passage $x^2$ leads from the bushing X at a point adjacent to the shoulder between the larger and smaller parts of said bushing outwardly through the wall of the valve-casing to the outer air. The smaller part of the valve-plug $X'$ is provided with a circumferential groove $x^3$, which when the valve-plug is at the outward limit of its movement is in line with the ports $x\ x'$ and affords a passage for the inflow of air from the passage $X^4$ to the smaller end of the controlling-valve chamber. At the inner end of the bushing X is formed a lateral port $x^5$, Fig. 24, with which port is connected a passage $X^5$, that leads laterally and then endwise through the wall of the cylinder and intersects the inlet-port P of the cylinder, as clearly seen in Fig. 28. A passage Y, Figs. 25 and 27, leads from the outer or larger end of the bushing X to the longitudinal passage T, which, as before described, communicates with one end of the cylinder by a port $t'$ and is connected with the larger end of the controlling-valve chamber. When the valve-plug $X'$ of the auxiliary valve is at the outward limit of its movement, air is free to pass from the supply-passage O through the passage $X^4$ and the ports $x$ $x$ and port $x'$ to the smaller end of the controlling-valve chamber, and when said valve-plug is at the inward limit of its movement the air-supply to the smaller end of the controlling-valve chamber will be cut off. The passage $x^2$ serves merely as a leakage-port to permit the escape of air from the interior of the auxiliary valve-bushing at its larger or outer end in the closing movement of the auxiliary valve. As soon as the port $t'$ is uncovered by the plunger B in its outward movement live air from the interior of the cylinder will pass through the passage T and will not only act on the inner larger end of the controlling-valve piston to force the same outward, but will also pass through the passage Y to the larger end of the auxiliary-valve chamber and act on the larger outer end $X^2$ of the valve-piston $X'$ to force said valve-piston inward, and thus cut off the passage of air to the controlling-valve chamber by the time the plunger reaches the outward limit of its stroke. It follows that at the time the controlling-valve piston is shifted to bring the same in position for the admission of pressure fluid to the outer end of the cylinder the auxiliary-valve plug will be set or shifted inwardly to its closed position and will retain this position during the inward stroke of the plunger. As the plunger approaches the inward limit of its stroke it will cover or close the cylinder exhaust-port R and will thereafter act to compress the air confined within the inner end of the cylinder, which will at this time have no outlet except through the passage $X^5$, which is connected with the inlet-port P at the inner end of the cylinder. The air thus compressed passing through the passage $X^5$ will act on the inner or smaller end of the valve-plug $X'$, thereby forcing said plug outwardly and bring the live-air port or passage O in communication with the smaller end of the controlling-valve chamber. As soon as communication is established between the live-air passage O and the smaller end of the controlling-valve chamber by the shifting outwardly of the valve-plug $X'$ in the manner above described live air will enter the said smaller end of the controlling-valve chamber and acting on the smaller end of the controlling-valve piston F will force the latter inwardly, thereby bringing it into position for admission of air to the inner end of the cylinder through the inlet-port P and for the exhaust of air from the cylinder through the main exhaust-port S, as hereinbefore described. When the controlling-valve piston is shifted inwardly, the air in the larger end of the inner controlling-valve chamber will exhaust through the passage T, because the latter passage will then be in communication through the port $t'$ with the outer end of the cylinder, which will be in communication with the outer air through the exhaust-ports W W. The auxiliary-valve plug $X'$ will remain in position to retain communication between the passage O and the outer or smaller end of the controlling-valve chamber until the plunger approaches the outer limit of its stroke and uncovers the port $t'$, when live air from the inner end of the cylinder will pass through the passage T and acting on the larger end of the said controlling-valve piston will force the latter outwardly, the air in the outer or smaller end of the controlling-valve being forced through the auxiliary valve and the passage $X^4$ back to the passage O because of the fact that the live-air pressure on the larger inner end of the controlling-valve piston will overcome that on the smaller end of said piston. When the controlling-valve piston has completed its outward stroke, the live air from the inner end of the cylinder entering the larger end of the auxiliary-valve bushing through said passage T and the connecting-passage Y will act on the larger end of the valve-plug $X'$ to force the latter inward and again close the auxiliary valve, the latter remaining in its closed position during the inward stroke of the plunger and until the auxiliary valve is again opened by the action of the air compressed in the inner end of the cylinder, so as to again admit live air to shift the controlling-valve into position for admission of air to the inner end of the cylinder, as before described.

I claim as my invention—

1. The combination with a cylinder and a plunger therein, of a live-air-actuated controlling-valve and an auxiliary valve, operated by air compressed within the inner end of the cylinder in the backward stroke of the plunger, for controlling the admission to the controlling-valve of air to actuate the said controlling-valve.

2. The combination with a cylinder and plunger therein, of a controlling-valve for controlling the admission and exhaust of air into and from the cylinder, embracing a valve-piston having two faces of different areas, means controlled by the plunger for admitting live air to act on the larger face of said valve-piston, and an auxiliary valve controlling the admission of live air to act on the smaller face of the said piston, said auxiliary valve being operated by pressure of air compressed in the inner end of the cylinder in the backward stroke of the plunger.

3. The combination with a cylinder and plunger therein, of a live-air-actuated controlling-valve, and an auxiliary valve for controlling the admission to the controlling-valve, said auxiliary valve having a valve-piston provided with two faces of different areas, its face of smaller area being subject to the pressure of air compressed in the cylinder in the backward stroke of the plunger, and means controlled by the plunger for admitting live-air pressure to the larger face of said piston.

4. The combination with a cylinder and a plunger therein, of a live-air-actuated controlling-valve embracing a valve-piston which is of larger area at one end than the other, means controlled by the plunger for admitting live air to act on the larger end of said valve-piston, and an auxiliary valve for controlling the admission of live air to act on the smaller end of said valve-piston, said auxiliary valve embracing a valve-piston having two faces of different areas, its smaller face being subject to the pressure of air compressed within the inner end of the cylinder in the back stroke of the plunger, and its larger face being subject to live-air pressure controlled by the movement of the plunger in the cylinder.

5. The combination with a cylinder and plunger therein, of a live-air-actuated controlling-valve, and an auxiliary valve for controlling the admission to the controlling-valve of live air to actuate the latter, said auxiliary valve having a shifting plug provided with two faces of different areas, its face of smaller area being subject to pressure of air compressed within the inner end of the cylinder in the backward stroke of the plunger, and its face of larger area being subject to direct air-pressure from an air-passage communicating with the outer end of the cylinder through a port which is uncovered by the plunger in its outward movement.

6. The combination with a cylinder and plunger therein, of a controlling-valve actuated by live air delivered thereto from the cylinder, and an auxiliary valve for controlling the supply of live air to the cylinder for operating the controlling-valve, said auxiliary valve being actuated by the pressure of air compressed in the inner end of the cylinder by the plunger in the backward stroke of the latter.

7. The combination with a cylinder and a plunger therein, of a controlling-valve controlling the admission and exhaust of air into and from the opposite ends of the cylinder, said valve embracing a valve-piston having at its ends faces of different areas, and which slides in a valve-chamber; the larger end of said valve-chamber being connected with the interior of the cylinder by a passage opening into the cylinder through a port near the outer end of said cylinder and which is uncovered by the plunger in its outward movement, and the smaller end of said chamber being connected with the interior of the cylinder by a passage opening into the cylinder near the inner end of the latter, an air-supply passage through which live air is delivered to the inner end of the cylinder to act on the smaller end of the controlling-valve piston, and an auxiliary valve for controlling the inflow of air to the cylinder through said supply-passage, embracing a valve-chamber larger at one end than the other and a valve-piston in the said chamber, having opposite faces of different areas, the smaller end of said auxiliary-valve chamber being in direct communication with the interior of the cylinder at the inner end of the latter, and the larger end of the said chamber communicating with a passage opening into the interior of the cylinder near its outer end through a port which is uncovered by the plunger when near the outer limit of its stroke.

8. The combination with a cylinder and a plunger therein, of a valve controlling the admission and exhaust of air into and from the opposite ends of the cylinder, said controlling-valve embracing a valve-chamber larger at one end than at the other, and a valve-piston in said chamber having opposite faces of different areas, said cylinder being provided with a passage connected with the larger part of the controlling-valve chamber and opening into the outer end of the cylinder by a port which is uncovered by the plunger in its outward movement, an auxiliary valve embracing a valve-chamber having larger and smaller parts, and provided in its smaller part with a port communicating with the air-supply passage, and a valve-piston in said auxiliary-valve chamber provided with faces of different areas, the cylinder having a passage connecting the larger part of the auxiliary-valve chamber with the outer end of the cylinder and opening into the latter by a port which is uncovered by the plunger in its outward movement; the smaller end of said auxiliary-valve chamber opening into the inner end of the cylinder, whereby the smaller face of the said auxiliary-valve piston is subject to the pressure of air compressed within said inner end of the cylinder in the backward stroke of the plunger.

9. The combination with a cylinder and a plunger therein, of a valve controlling the admission and exhaust of air into and from the opposite ends of the cylinder, said valve embracing a valve-casing having large and small parts, and a valve-piston in said chamber having opposite faces of different areas, said cylinder being provided with a passage connecting the larger part of the valve-chamber with the interior of the cylinder near its outer end, and which opens into the cylinder through a port which is uncovered by the plunger in its outward movement, said cylinder being also provided with a passage connecting the smaller end of said controlling-valve chamber with the interior of the cylinder near the inner end of the latter, an auxiliary valve embracing a valve-casing having a port communicating with the air-supply passage, and a valve-piston in said auxiliary-valve chamber provided with opposite faces of different areas, a passage connecting the larger part of the auxiliary-valve chamber with the outer end of the cylinder and which opens into the latter through a port which is uncovered by the plunger in its outward movement, the smaller end of the controlling-valve chamber being in open communication with the said cylinder at the inner end of the latter, said auxiliary valve operating to open and close communication between the air-supply passage and the inner end of the cylinder, and the auxiliary-valve piston being operated to open the auxiliary valve by air compressed in the inner end of the cylinder acting on the smaller end of said piston, whereby the smaller end of the controlling-valve piston is subject to the pressure of air entering the cylinder from the auxiliary valve and passing from the cylinder to the smaller part of said controlling-valve chamber.

10. The combination with a cylinder and a plunger therein, of a controlling-valve comprising a valve-chamber which is closed at both ends and is provided at its ends with cylindric parts of different diameters, said valve-chamber being provided with five lateral, longitudinally-separated ports, to wit, an admission-port for the inner end of the cylinder, a main air-supply port, a supply and exhaust port for the outer end of the cylinder, a main exhaust-port, and an exhaust-port for the inner end of the cylinder, said main air-supply port being located between the admission-port for the inner end of the cylinder and the admission and exhaust port for the outer end of the cylinder, and the main exhaust-port being located between the said supply and exhaust port for the outer end of the cylinder and the exhaust-port for the inner end of the cylinder, and said exhaust-port for the inner end of the cylinder being located in the cylindric smaller part of the chamber, and a valve-piston having at one end a larger cylindric flange that fits and slides in the lower end of the valve-chamber and is adapted to open and close communication between the admission-port for the inner end of the cylinder and the main supply-port, and at its opposite end with a smaller flange, which is adapted to fit and slide within the smaller end of the cylinder and to open and close communication between the exhaust-port for the inner end of the cylinder and the main exhaust-port, and said valve-piston being provided with an intermediate flange adapted to be shifted to one side or the other of the admission and exhaust port for the outer end of the cylinder to bring the same into communication with either the main admission-port or the main exhaust-port, and means for supplying air under pressure to the opposite ends of the valve-chamber for actuating said valve-piston.

11. The combination with a cylinder and a plunger therein, of a controlling-valve comprising a valve-chamber which is closed at both ends and is provided at its ends with cylindric parts of different diameters, said valve-chamber being provided with five lateral, longitudinally-separated ports, to wit, an admission-port for the inner end of the cylinder, a main air-supply port, a supply and exhaust port for the outer end of the cylinder, a main exhaust-port, and an exhaust-port for the inner end of the cylinder, said main air-supply port being located between the admission-port for the inner end of the cylinder and the admission and exhaust port for the outer end of the cylinder, and the main exhaust-port being located between the said supply and exhaust port for the outer end of the cylinder and the exhaust-port for the inner end of the cylinder, and said exhaust-port for the inner end of the cylinder being located in the cylindric smaller part of the chamber, and a valve-piston having at one end a larger cylindric flange that fits and slides in the lower end of the valve-chamber and is adapted to open and close communication between the admission-port for the inner end of the cylinder and the main supply-port, and at its opposite end with a smaller flange which is adapted to fit and slide within the smaller end of the cylinder and to open and close communication between the exhaust-port for the inner end of the cylinder and the main exhaust-port, and said valve-piston being provided with an intermediate flange adapted to be shifted to one side or the other of the admission and exhaust port for the outer end of the cylinder to bring the same into communication with either the main admission-port or the main exhaust-port, said cylinder being provided with a passage leading from the larger end of the valve-chamber toward the outer end of the cylinder and opening into the latter through a port which is uncovered by the plunger when the latter approaches the outward limit of its stroke, and with a passage connected with the smaller end of said valve-chamber through which air under pressure is admitted to the latter.

In testimony that I claim the foregoing as my invention I affix my signature, in presence of two witnesses, this 25th day of May, A. D. 1905.

REINHOLD A. NORLING.

Witnesses:
 WM. H. PEASE,
 HARVEY MCGINNIS.